Nov. 3, 1942.    R. T. KRIEBEL    2,301,126
GLARE ELIMINATION APPARATUS
Filed Nov. 30, 1939    2 Sheets—Sheet 1
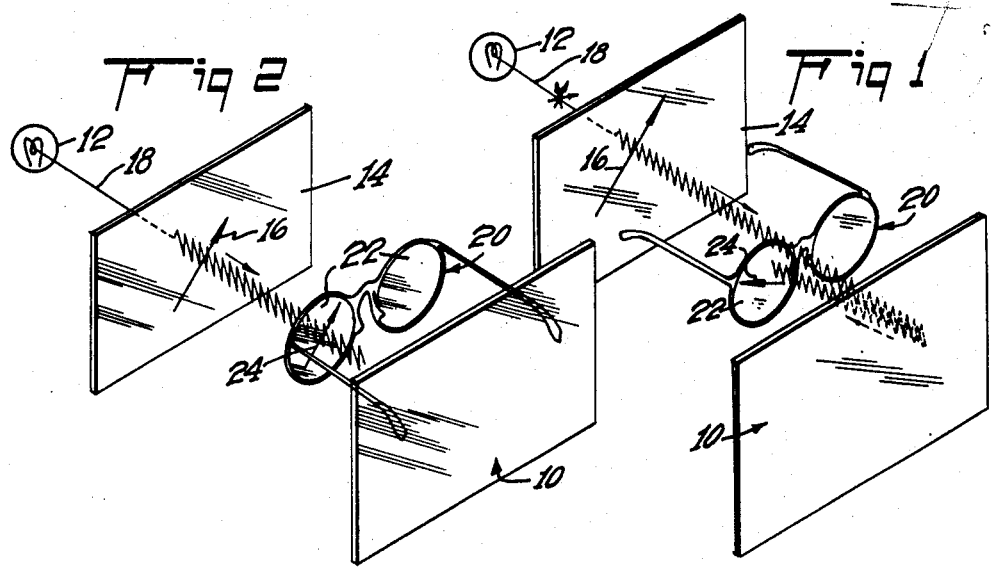
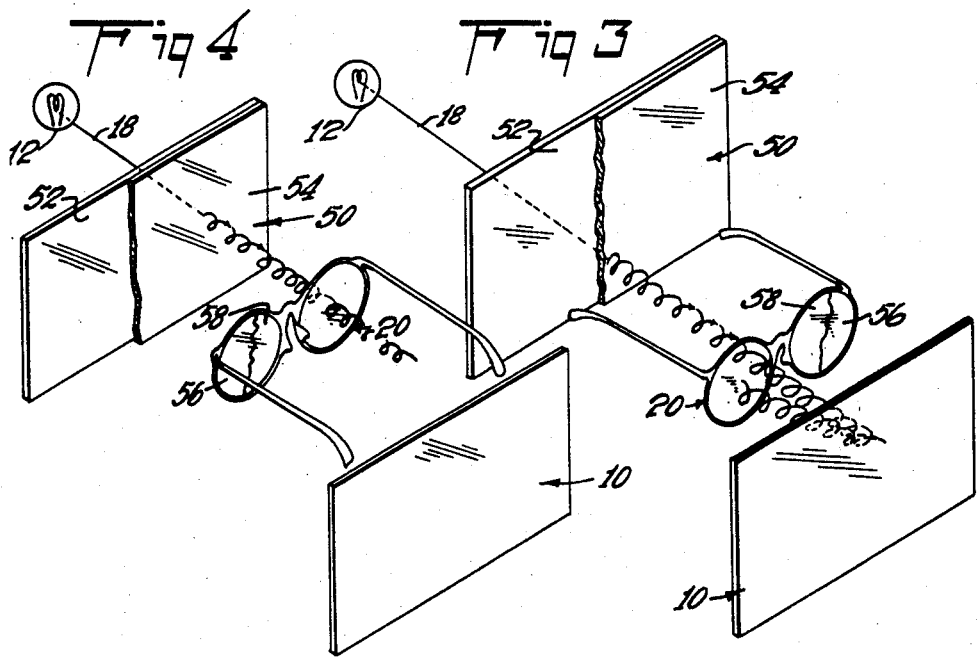
INVENTOR.
Richard T. Kriebel
BY Brown & Jones
ATTORNEYS Nov. 3, 1942.    R. T. KRIEBEL    2,301,126
GLARE ELIMINATION APPARATUS
Filed Nov. 30, 1939    2 Sheets-Sheet 2

INVENTOR.
Richard T. Kriebel
BY
Brown & Jones
ATTORNEYS

Patented Nov. 3, 1942

2,301,126

UNITED STATES PATENT OFFICE 2,301,126

GLARE ELIMINATION APPARATUS

Richard T. Kriebel, Boston, Mass., assignor to Polaroid Corporation, Dover, Del., a corporation of Delaware Application November 30, 1939, Serial No. 306,821

5 Claims. (Cl. 88—65)

This invention relates to glare-elimination apparatus, and more specifically to such apparatus for use in systems employing polarized light.

The drivers of automotive vehicles, such as passenger-carrying buses and the like, and of other transportation devices, such as street-cars, locomotives and other vehicles, are frequently annoyed by light reflected from the inner surface of the transparent windshield or other similar element through which the operator views the roadway in advance of the vehicle. These reflections are particularly troublesome at night, and arise generally from light sources within the vehicle. So also undesired reflections frequently arise from other glass surfaces, such for example as the glass covers for dials and recording devices, gauges and the like. These reflections almost invariably arise as the result of light sources behind an observer which are mirrored in the glass surface of the cover glass.

In order to avoid the effect of these reflections, opaque curtains have been provided, screening the operator of the vehicle from the light sources behind him and within the vehicle, or in certain circumstances the operator of the vehicle has been positioned within a separate compartment, which is completely screened from light originating within the vehicle. It is frequently desirable, however, especially where the vehicle operator has no assistant in handling the vehicle, that the operator have easy and constantly available visual access to the interior of the vehicle. Where opaque screens are provided between the operator and the interior of the vehicle, they must be displaced before the operator can see the passengers behind him.

An object of this invention is to provide transparent light-polarizing means, one of said means being in the form of a screen positioned between the operator of a vehicle and the light sources within the vehicle, and another of said screens being in the form of a viewing screen positioned between the operator of the vehicle and the windshield thereof.

A further object of the invention is to provide apparatus of the character described adapted, when the operator of the vehicle is looking through the windshield or similar element, to block from his eyes reflections of light sources originating from within the vehicle, and yet adapted, when the operator turns his head, to permit him to look directly into the vehicle and through the screen positioned between him and the interior of the vehicle.

A still further object of the invention is to provide generally means comprising a polarizing screen positioned between a light source and a reflecting surface to be viewed by an observer and adapted to impart a predetermined polarizing characteristic to light emanating from the source and incident on the surface, so that the said light, when reflected therefrom to the eyes of an observer, may be blocked by the interposition between the observer's eyes and the reflecting surface of a supplemental light-polarizing screen or visor.

Other objects of the invention will in part be obvious and will in part appear hereinafter.

The invention accordingly comprises the features of construction, combination of elements, and arrangement of parts which will be exemplified in the construction hereinafter set forth and the scope of the application of which will be indicated in the claims.

For a fuller understanding of the invention, reference should be had to the accompanying drawings, in which:

Figure 1 represents diagrammatically one form of the invention with the apparatus thereof in position for an obesrver to look through the windshield or other protective transparent viewing screen employed;

Fig. 2 is a diagrammatic representation of the apparatus shown in Fig. 1 in position for the observer to look rearwardly into the interior of the vehicle;

Fig. 3 is a view similar to Fig. 1 of a modified form of the invention;

Fig. 4 is a view similar to Fig. 2 of the modification of the invention shown in Fig. 3.

Figure 5:
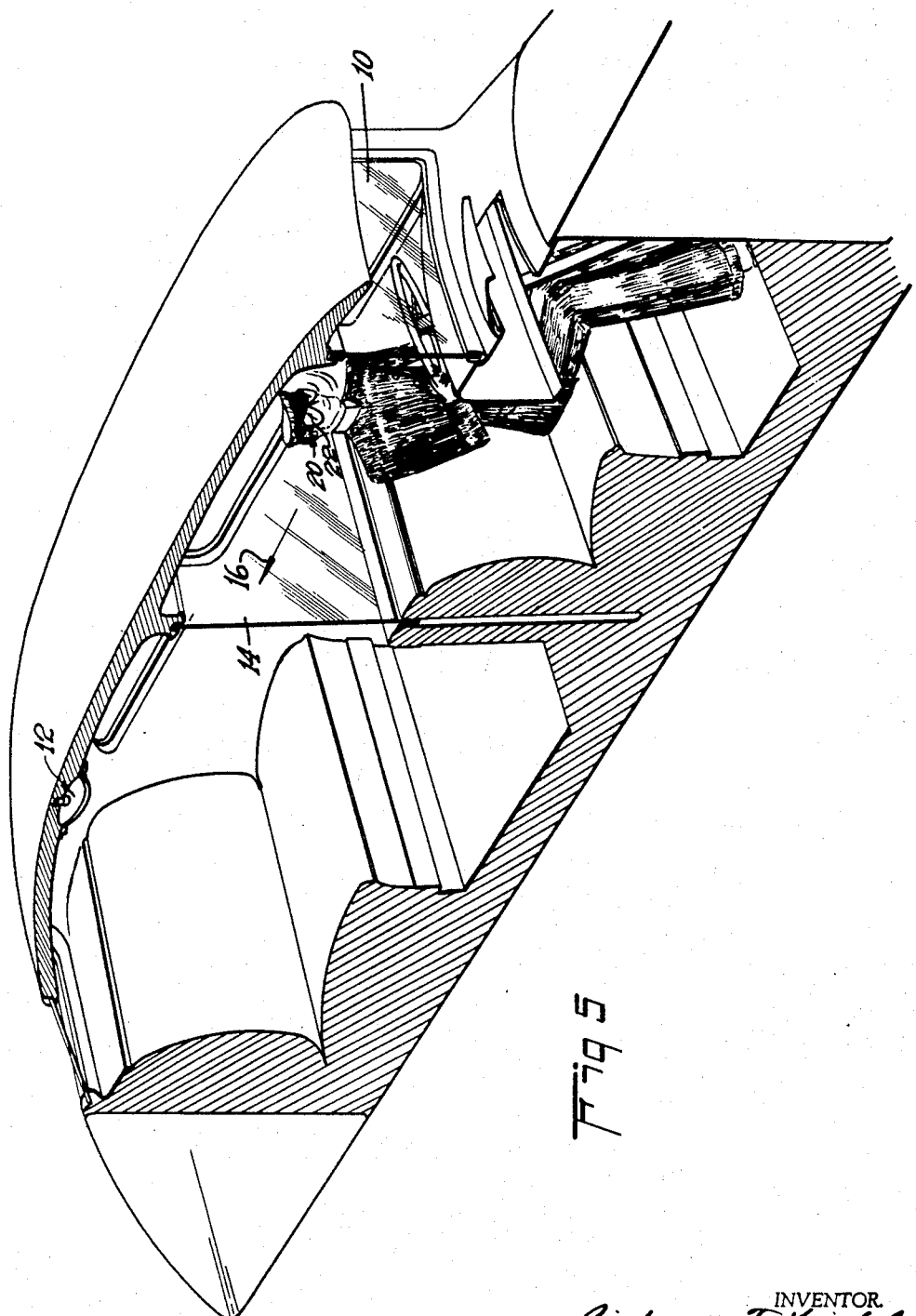
Fig. 5 is a diagrammatic view of a portion of a vehicle and the operator thereof, showing how the apparatus of the invention may be employed.

With reference to Figs. 1 and 2, which show a preferred form of the invention, 10 designates a transparent windshield or other viewing screen positioned in front of the operator of a vehicle; 12 represents a light source within the vehicle; and 14 represents a transparent light-polarizing screen positioned behind the operator of the vehicle and between him and the interior of the vehicle and adapted to intercept light emanating from the source 12 before it impinges upon the inner surface of the windshield 10.

The screen 14 preferably comprises a light-polarizing element, such for example as the sheet-like polarizing material sold under the trade name "Polaroid." It may, however, comprise any suitable light-polarizing material. The light-polarizing material of the sheet 14 is preferably positioned with its polarizing axis at an angle of substantially 45° to the horizontal, as illustrated by the arrow 16 in Figs. 1 and 2.

18 is intended to illustrate a beam of light emanating from the source 12 and being non-polarized until it is transmitted by the sheet 14. Upon transmission by that sheet it becomes plane-polarized, vibrating in a direction substantially 45° to the horizontal.

20 indicates generally a viewing device, such as a spectacle frame having mounted therein suitable light-polarizing elements 22. These light-polarizing elements may comprise the same material as that forming the element 14. The polarizing lenses 22 are preferably mounted in the frame of the viewing device 20 with their polarizing axes parallel to each other and inclined at an angle of approximately 45° to the horizontal, as shown for example by the arrows 24. The inclination of the polarizing axis of the element 22 is such that as the operator wearing the device 20 looks forwardly through the windshield 10, the axes of the elements 22 will be crossed and substantially at right angles with the polarizing axis 16 of the element 14. This is the condition shown diagrammatically in Fig. 1, and under these conditions light emanating from the source 12 and traversing the screen 14 and reflected from the inner surface of the windshield 10 is blocked by the polarizing elements 22 in the viewing device 20.

Preferably, the viewing device 20, which is shown as a spectacle frame and lenses, is worn by or movable with the operator, so that as the operator turns his head to look backwardly into the interior of the vehicle, the position of the viewing screen with respect to the screen 14 is reversed, as shown in Fig. 2. The axes of the polarizing elements 22 are now parallel to the polarizing axis of the screen 14, and the driver of the vehicle can readily see through the screen 14 into the interior of the vehicle.

In Fig. 5 there is shown somewhat diagrammatically a portion of a vehicle equipped with a screen 14 and provided with a windshield 10. The driver of the vehicle is shown wearing a viewing device 20 equipped with polarizing lenses 22.

The apparatus described in connection with Figs. 1, 2 and 5 has been considered specifically in connection with instances in which the windshield or other protective screen 10 is substantially vertical and in which the light source 12 is substantially directly behind the observer.

It is to be understood that the apparatus may be modified somewhat where the conditions are not such as those described. For example, if the screen 10 is inclined from the vertical, or if the light source 12 is off to one side, or if both these conditions obtain, best results may be obtained by adjusting the screen 14 so that its polarizing axis 16 is no longer at 45° to the horizontal. Under such circumstances it may be desirable to adjustably mount the screen 14 so that the observer may rotate it, for example, so as to obtain the best results from the polarizing filters 22. On the other hand the polarizing filters 22 may be mounted for rotation and the axis of the screen 14 may remain at 45° to the horizontal, or both of the polarizing elements 14 and the lenses in the device 20 may be adjustable so that the reflected polarized light from the surface of the element 10, after it has been transmitted by the screen 14, may be blocked by the polarizing elements in the device 20. It will be understood that even where conditions are such that the polarizing axes of the elements 22, for example, are no longer parallel and perpendicular to the polarizing axis of the element 40 in the positions shown in Figs. 2 and 1, the observer wearing the viewing device 20 will still be able to see through the screen 14, for it is only when the polarizing axes of the viewing device 20 are crossed with that of the screen 14 that the observer cannot see beyond the screen 14 when his head is in the position indicated in Fig. 2.

It will be understood furthermore that the sheet 10 need not be a planar element. In many cases, as for example where the sheet 10 is a cover glass for a recording instrument or the like, it may be curved, and under such circumstances the observer may frequently shift his position with respect to the sheet 10. It may be advantageous under these conditions for the lens elements 22 to be mounted together for rotation in the frame 20 so that the observer may adjust the position of the polarizing axes 24 for maximum efficiency. All such modifications are deemed to fall within the scope of the invention.

It is further to be understood that the undesired reflections may be actually the result of multiple reflection from a light source positioned far from the surface to be viewed. While the drawings show a direct beam emanating from the source 12 and incident on the sheet 10, it is to be understood that the invention is applicable to situations in which the sheet 14 is positioned in the path of a beam which may have been already many times reflected. All such modifications of the device are to be deemed to fall within the scope of the invention.

The apparatus described in connection with Figs. 1, 2 and 5 is adapted for use with a system employing plane-polarized light. In a modified form of the invention shown diagrammatically in Figs. 3 and 4, somewhat similar apparatus is employed with a system which uses circularly polarized light.

In Figs. 3 and 4, the numeral 10 again indicates the windshield or other protective transparent screen behind which the driver of the vehicle is positioned, 12 indicates a light source within the vehicle, and 20 indicates generally a viewing device such as a pair of viewing spectacles or the like worn by the driver of the vehicle.

In this modification of the invention, a screen shown generally as at 50 and adapted to circularly polarize light emitted from the source 12 and projected in the direction of the driver of the vehicle, is positioned between the driver and the light sources within the vehicle. This screen may comprise a sheet of polarizing material, such as that described and claimed in U. S. Patent No. 2,099,694, which issued November 23, 1937. This sheet comprises generally a light-polarizing element 52 and a cooperating quarter-wave device 54. The quarter-wave device preferably has its axis positioned at 45° to the polarizing axis of the sheet 52, and the two elements, 52, 54, are thus adapted to impart circular polarization to a beam of transmitted light.

The viewing device 20 is similarly equipped with each lens provided with a composite sheet of material comprising a light-polarizing element 56 and a quarter-wave device 58 superimposed thereon and adapted to act as an analyzer for circularly polarized light. Here again it will be understood that the polarizing element 56 is interposed between the quarter-wave device 58 and the eyes of the observer, and that the axis of the quarter-wave device 58 is positioned at 45° to the polarizing axis of the element 56.

If the sheet 50 is adapted to clockwise circularly polarize the light transmitted by it in a direction toward the operator of the car, then that light, upon reflection from the inner surface of the windshield 10, becomes counterclockwise circularly polarized, and the analyzing elements in the viewing glass 20 should be formed to block counterclockwise circularly polarized light. Under these circumstances, if the operator of the vehicle turns his head to look back into the interior of the vehicle, the analyzers in the viewing device which he is wearing will transmit the clockwise circularly polarized light transmitted by the screen 50.

So also if the screen 50 is adapted to transmit counterclockwise circularly polarized light, then the polarizing lenses in the viewing device 20 should be constructed to block circularly polarized light.

While the device of the present invention has been illustrated and described in connection with the use of plane polarizers and circular polarizers, it is to be understood that other modified forms may be employed. For example, wave-retardation devices may be used in the structures shown in Figs. 3 and 4 which impart elliptical polarization to the transmitted beam. Such modifications of the invention are to be deemed to fall within its scope.

So also, while the device has been described with particular relation to its use in connection with transportation vehicles and the operators thereof, it is to be understood that it may be employed elsewhere, and wherever it is desired to reduce or eliminate reflection glare arising from light sources positioned behind an observer and which are reflected from a transparent viewing screen positioned in front of the observer. Under these circumstances, if the light emanating from the source is polarized in the manner described, and if the observer is equipped with a suitable analyzer adapted to block that light when it is reflected from the surface in front of the observer, the present invention will have been utilized.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. In combination, means providing an enclosure, a light source within said enclosure, a transparent window in the said enclosure-providing means, a transparent light-polarizing element positioned within said enclosure to intercept and polarize light emanating from said source and incident on said window, said polarizing element being spaced from said window to provide a recess therebetween for an observer, and a supplemental transparent light-polarizing viewing screen positioned within said recess and before the eyes of an observer therein and adapted to block light emanating from said source and traversing said first-mentioned polarizing element and reflected from the inner face of said window, said supplemental viewing screen being movable and being adapted, when rotated about a vertical axis through an angle of 180° and when positioned between an observer and said first-mentioned polarizing element, to transmit polarized light traversing said first-mentioned polarizing element.

2. In combination, means providing an enclosure, a light source within said enclosure, a transparent window in the said enclosure-providing means, a transparent light-polarizing element positioned within said enclosure to intercept and polarize light emanating from said source and incident on said window, said polarizing element being spaced from said window to provide a recess therebetween for an observer, and a supplemental transparent light-polarizing viewing screen mounted for rotation about a vertical axis and positioned within said recess and before the eyes of an observer therein and adapted to block light emanating from said source and traversing said first-mentioned polarizing element and reflected from the inner face of said window, each of said polarizing elements being plane polarizers mounted with their polarizing axes at angles of substantially 45° to the horizontal.

3. In combination, means providing an enclosure, a light source within said enclosure, a transparent window in the said enclosure-providing means, a transparent light-polarizing element positioned within said enclosure to intercept and polarize light emanating from said source and incident on said window, said polarizing element being spaced from said window to provide a recess therebetween for an observer, and a supplemental transparent light-polarizing viewing screen mounted for rotation about a vertical axis and positioned within said recess and before the eyes of an observer therein and adapted to block light emanating from said source and traversing said first-mentioned polarizing element and reflected from the inner face of said window, each of said polarizing elements being adapted to circularly polarize transmitted light.

4. In combination, means providing an enclosure, a light source within said enclosure, a transparent window in the said enclosure-providing means, a transparent light-polarizing element positioned within said enclosure to intercept and polarize light emanating from said source and incident on said window, said polarizing element being spaced from said window to provide a recess therebetween for an observer, and a supplemental transparent light-polarizing viewing screen in the form of ophthalmic mounting means having a pair of light-polarizing lenses mounted therein and positioned before the eyes of an observer within said recess, said lenses being adapted to block light traversing said first-mentioned polarizing element and reflected from the inner surface of said window and being adapted, when rotated through an angle of approximately 180° about a vertical axis, to transmit light traversing said first-mentioned polarizing element and directly incident on said lenses.

5. A vehicle comprising, in combination, means providing a compartment for passengers, a light source within said compartment, means providing a compartment for a vehicle operator and comprising a transparent windshield, a transparent light-polarizing element positioned between said passenger compartment and said operator compartment to intercept light emanating from the light source within said passenger compartment and incident on said windshield, and a supplemental light-polarizing viewing visor positioned within said operator compartment before the eyes of an operator therein and movable at the will of the said operator from a position between the operator and the windshield to a position between the operator and the first-mentioned polarizing element and adapted, when positioned between the operator and the windshield, to block polarized light emanating from the light source within the passenger compartment and reflected from the inner surface of the windshield, and adapted, when between the operator and the first-mentioned polarizing element to transmit light emanating from the light source within the passenger compartment and traversing said first-mentioned polarizing element.

RICHARD T. KRIEBEL.